United States Patent
Hayashi

(10) Patent No.: US 10,414,635 B2
(45) Date of Patent: Sep. 17, 2019

(54) REMOTE OPERATION DEVICE AND GUIDANCE SYSTEM

(71) Applicant: TADANO LTD., Kagawa (JP)

(72) Inventor: Hiroyuki Hayashi, Kagawa (JP)

(73) Assignee: TADANO LTD., Kagawa (JP)

( * ) Notice: Subject to any disclaimer, the term of this patent is extended or adjusted under 35 U.S.C. 154(b) by 0 days.

(21) Appl. No.: 15/765,170

(22) PCT Filed: Oct. 6, 2016

(86) PCT No.: PCT/JP2016/079861
§ 371 (c)(1),
(2) Date: Mar. 30, 2018

(87) PCT Pub. No.: WO2017/065093
PCT Pub. Date: Apr. 20, 2017

(65) Prior Publication Data
US 2018/0282131 A1    Oct. 4, 2018

(30) Foreign Application Priority Data

Oct. 13, 2015 (JP) ................. 2015-201787

(51) Int. Cl.
*B66C 13/44* (2006.01)
*B66C 23/70* (2006.01)
(Continued)

(52) U.S. Cl.
CPC .............. *B66C 13/44* (2013.01); *B66C 13/40* (2013.01); *B66C 23/00* (2013.01); *B66C 23/36* (2013.01); *B66C 23/70* (2013.01); *G06T 19/006* (2013.01)

(58) Field of Classification Search
CPC ......... B66C 13/44; B66C 23/36; B66C 13/40; B66C 23/00; G06T 19/006
See application file for complete search history.

(56) References Cited

U.S. PATENT DOCUMENTS 5,851,149 A * 12/1998 Xidos ................... G07F 17/32
463/42
2011/0066335 A1    3/2011 Hashimoto et al.
(Continued)

FOREIGN PATENT DOCUMENTS

CN       103869469 A    6/2014
EP         1491486 A1   12/2004
(Continued)

OTHER PUBLICATIONS

Machine translation JP2000-296985A (Year: 2000).*
(Continued)

*Primary Examiner* — Frederick M Brushaber
(74) *Attorney, Agent, or Firm* — Paratus Law Group, PLLC

(57) ABSTRACT

A remote operation device capable of providing, to the operator, guidance of a work content to be performed by manual work or remote operation on the work machine in accordance with a state of the work machine, is a remote operation device (40) configured to be capable of communicating with the work machine, and includes: an operation unit (42) that generates an operation signal for performing remote operation of the work machine in accordance with operator's operation; a reception unit (40a) that receives detection signals of detection devices (81 to 84) that detect the state of the work machine; and a display unit (43) that displays a screen indicating a work content to be performed by manual work or the remote operation on the work machine on the basis of the received state of the work machine.

8 Claims, 6 Drawing Sheets

(51) Int. Cl.
*G06T 19/00* (2011.01)
*B66C 23/36* (2006.01)
*B66C 13/40* (2006.01)
*B66C 23/00* (2006.01)

(56) References Cited

U.S. PATENT DOCUMENTS

| | | | |
|---|---|---|---|
| 2012/0232763 A1* | 9/2012 | Mizuochi | B66C 23/905 |
| | | | 701/50 |
| 2013/0083003 A1* | 4/2013 | Perez | G06F 3/005 |
| | | | 345/419 |
| 2013/0083009 A1* | 4/2013 | Geisner | A63F 13/02 |
| | | | 345/419 |
| 2013/0345857 A1 | 12/2013 | Lee et al. | |
| 2014/0111648 A1* | 4/2014 | Ishimoto | B60R 1/00 |
| | | | 348/148 |
| 2014/0168266 A1 | 6/2014 | Kimura | |
| 2016/0348504 A1* | 12/2016 | Hanski | E21B 44/00 |
| 2018/0282131 A1* | 10/2018 | Hayashi | B66C 13/40 |
| 2019/0039862 A1* | 2/2019 | Palberg | G09B 9/05 |

FOREIGN PATENT DOCUMENTS

| | | |
|---|---|---|
| JP | 2740035 B2 | 4/1998 |
| JP | H11-278789 A | 10/1999 |
| JP | 2000-296985 A | 10/2000 |
| JP | 2001-335286 A | 12/2001 |
| JP | 2004-001987 A | 1/2004 |
| JP | 2005-289600 A | 10/2005 |
| JP | 4242942 B2 | 3/2009 |
| JP | 2009-274791 A | 11/2009 |

OTHER PUBLICATIONS

Machine translation JP11-278789A (Year: 1999).*
Machine translation JP2009-274791A (Year: 2009).*
Machine translation JP2005-289600A (Year: 2005).*
Oct. 24, 2017, Japanese Office Action issued for related JP Application No. 2015-201787.
Jan. 10, 2017, International Search Opinion issued for related PCT Application No. PCT/JP2016/079861.
Jan. 10, 2017, International Search Report issued for related PCT Application No. PCT/JP2016/079861.
Jun. 11, 2019, European Search Report issued for related EP Application No. 16855347.7.

* cited by examiner (a)

(b)

(c)

REMOTE OPERATION DEVICE AND GUIDANCE SYSTEM

CROSS REFERENCE TO PRIOR APPLICATION

This application is a National Stage Patent Application of PCT International Patent Application No. PCT/JP2016/079861 (filed on Oct. 6, 2016) under 35 U.S.C. § 371, which claims priority to Japanese Patent Application No. 2015-201787 (filed on Oct. 13, 2015), which are all hereby incorporated by reference in their entirety.

TECHNICAL FIELD

The present invention relates to a remote operation device and a guidance system.

BACKGROUND ART

Conventionally, in a work machine such as a mobile crane, a remote operation device has been devised that operates the work machine from the outside of an operator's cab.

For example, Patent Literature 1 discloses an operation device configured such that control by an auxiliary operation panel is possible only in a case where an overload prevention device is set in a jib extending/storing mode, and a controllable range is limited to a range in which crane operation necessary for jib extending/storing is performed.

CITATION LIST

Patent Literature

Patent Literature 1: JP 2740035 B2

SUMMARY OF THE INVENTION

Problems to be Solved by the Invention

However, the conventional technology including the operation device of Patent Literature 1 described above has not included a function of providing guidance of a work procedure. For that reason, for an operator to perform work preparation using the remote operation device, it has been required to remember the work procedure. Therefore, in a case where the operator forgets or erroneously performs the work procedure, it has been required to find necessary information from a manual provided in the operator's cab.

It is an object of the present invention to provide a remote operation device and a guidance system capable of providing, to the operator, guidance of a work content to be performed by manual work or remote operation on the work machine in accordance with a state of the work machine.

Solutions to Problems

A remote operation device according to the present invention is a remote operation device configured to be capable of communicating with a work machine, and the remote operation device includes: an operation unit that generates an operation signal for performing remote operation of the work machine in accordance with operator's operation; a reception unit that receives a detection signal of a detection device that detects a state of the work machine; and a display unit that displays a screen indicating a work content to be performed by manual work or the remote operation on the work machine on the basis of the state of the work machine.

Effects of the Invention

According to the present invention, guidance can be provided of a correct procedure to the operator in accordance with a work scene on the basis of the actual state of the work machine.

BRIEF DESCRIPTION OF DRAWINGS

FIG. 5(a) illustrates that a pin check at jib extending/storing is NG,
FIG. 5(b) illustrates details of a jib connecting pin and a jib storing pin,
and FIG. 5(c) illustrates that the pin check at jib extending/storing is OK.

DESCRIPTION OF EMBODIMENTS

Hereinafter, embodiments of the present invention will be described with reference to the drawings. However, the constituent elements described in the following embodiments are examples, and the technical scope of the present invention is not limited thereto.

First Embodiment

First, with reference to FIG. 1, an overall configuration will be described of a rough terrain crane 1 of a present embodiment that is a mobile crane including a work procedure guidance system S. In the following embodiment, the rough terrain crane 1 will be described as an embodiment of a mobile crane to which the present invention is applied; however, the present invention is not limited thereto, and the present invention can be widely applied to a mobile crane such as an all terrain crane, or other work machines.

(Overall Configuration of Crane)

Figure 1:
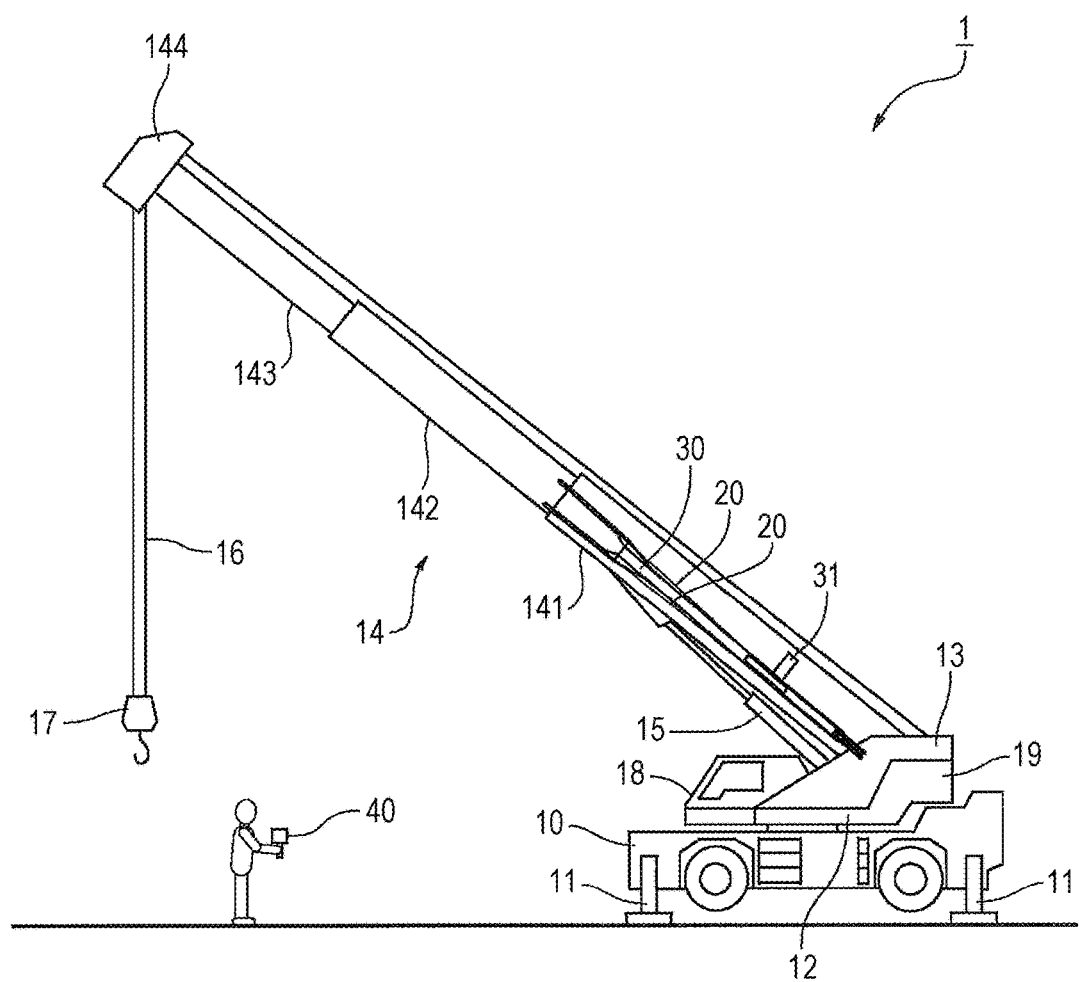
FIG. 1 is a side view of a mobile crane.

As illustrated in FIG. 1, the rough terrain crane 1 of the present embodiment includes a vehicle body 10 that is a main body portion of a vehicle having a driving function, outriggers 11, . . . provided at four corners of the vehicle body 10, a swivel base 12 attached to be horizontally rotatable to the vehicle body 10, and a boom 14 attached to a bracket 13 installed upright on the swivel base 12.

Figure 2:
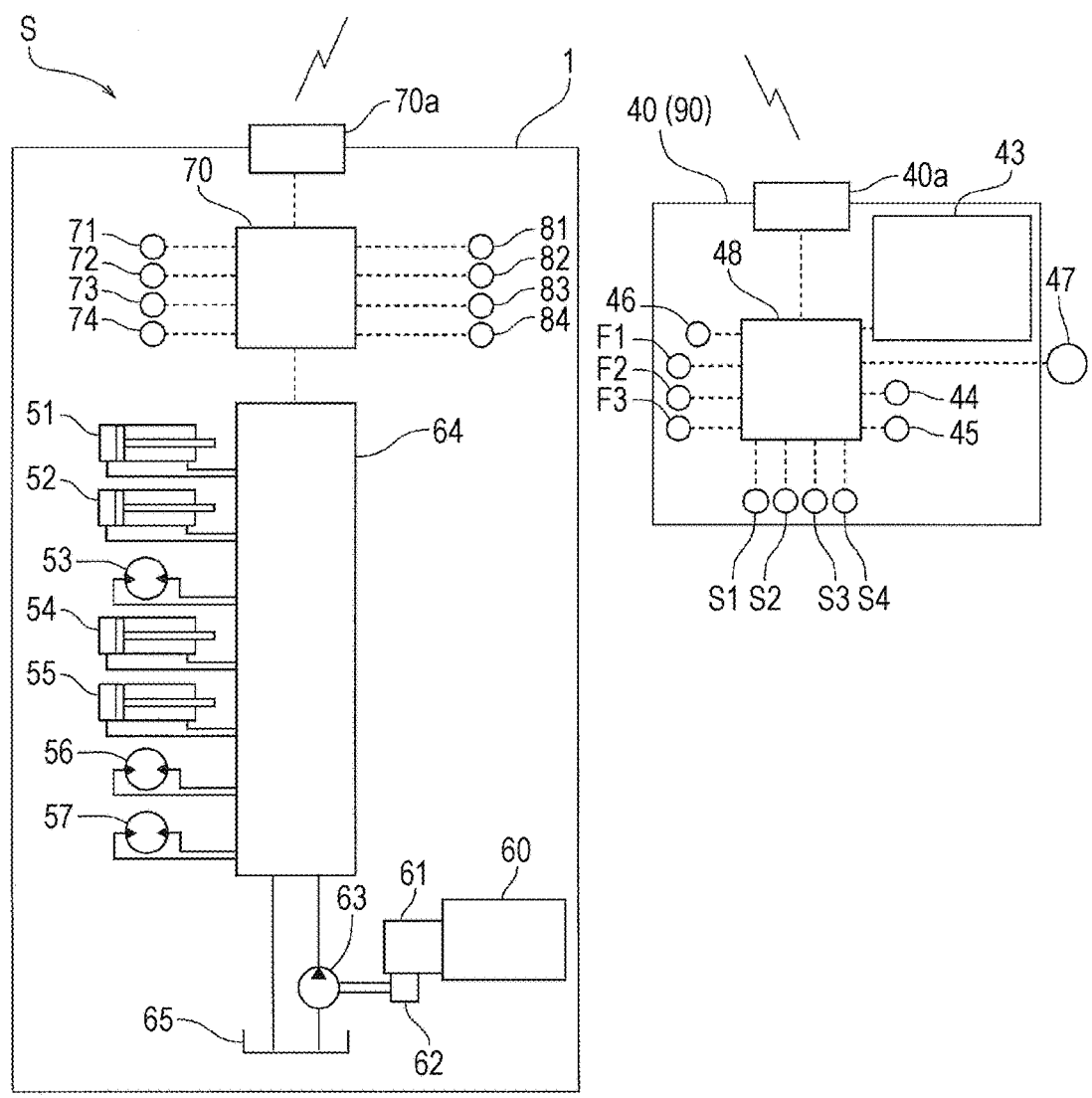
FIG. 2 is a block diagram of a control system of an embodiment.

Each outrigger 11 is capable of slide extension and slide storage in the width direction from the vehicle body 10 by expanding and contracting a slide cylinder 52 (see FIG. 2), and is capable of jack extension and jack storage in the vertical direction from the vehicle body 10 by expanding and contracting a jack cylinder 51 (see FIG. 2).

The swivel base 12 includes a pinion gear to which power of a swing motor is transmitted, and the pinion gear engages with a circular gear provided on the vehicle body 10, whereby the swivel base 12 rotates around a pivot. The swivel base 12 includes an operator's cab 18 disposed at the front right side, a bracket 13 disposed at the rear center, and a counterweight 19 disposed at the rear lower part.

The boom 14 is telescopically configured by a base end boom 141, an intermediate boom 142 and a top boom 143, and can be expanded and contracted by a telescopic cylinder disposed therein. A sheave 144 is disposed at a boom head that is the most distal end of the top boom 143, and a wire rope 16 is wound around the sheave 144 and a hook block 17 is suspended.

The base end boom 141 that is in the outermost side, whose base portion is rotatably attached to a support shaft horizontally installed on the bracket 13, can be vertically hoisted with the support shaft as a rotation center. Further, a hoisting cylinder 15 is bridged between the bracket 13 and the lower surface of the base end boom 141, so that the entire boom 14 can be hoisted by expanding and contracting the hoisting cylinder 15.

Further, in the rough terrain crane 1 of the present embodiment, a jib 30 and tension rods 20, 20 are stored in a laterally-held posture on a side surface of the base end boom 141. The jib 30 and the tension rods 20, 20 are mounted and stored using a plurality of pins (not illustrated) and a side up cylinder 31.

(Configuration of Control System)

Next, with reference to FIG. 2, a configuration will be described of a control system including a remote operation device 40 in the rough terrain crane 1 of the present embodiment. The control system of the present embodiment includes, as actuators, four jack cylinders 51, . . . , four slide cylinders 52, . . . , a swing motor 53, a hoisting cylinder 54, a telescopic cylinder 55, a main winch motor 56, and a sub-winch motor 57. These actuators 51 to 57 are controlled by a control valve 64 described later.

The control system of the present embodiment includes, as hydraulic circuits, a Power Take-Off (PTO) 62 that takes power from a transmission 61 of an engine 60, a hydraulic pump 63 that is rotationally driven by the PTO 62 and pressurizes hydraulic fluid from an oil tank 65, and the control valve 64 that controls a flow of the hydraulic fluid discharged from the hydraulic pump 63. The control valve 64 includes a valve group corresponding to the actuators 51 to 57. Each valve is controlled by a controller 70.

The controller 70 is a computer including a bus, a computing device, a storage device, and the like. The controller 70 receives an operation signal from a swing lever 71, a hoisting lever 72, a telescoping lever 73, a main winch lever 74, or the like, or receives an operation signal from the remote operation device 40 via a communication unit 70*a*. On the basis of the received operation signal, the controller 70 calculates a moving direction and a moving amount of each valve and transmits a signal to the control valve 64, thereby controlling the actuators 51 to 57.

In the present embodiment, as a detection device that detects a state of the work machine (mobile crane), a top jib fixing pin detection device 81, a jib set storing pin detection device 82, and a tension rod fixing pin detection device 83, each of which is a proximity switch or a limit switch, a boom length detector 84, and the like are connected to the controller 70. The controller 70 transmits the state of the work machine detected by the detection devices 81 to 84 to the remote operation device 40 via the communication unit 70*a* as a transmission unit.

Figure 3:
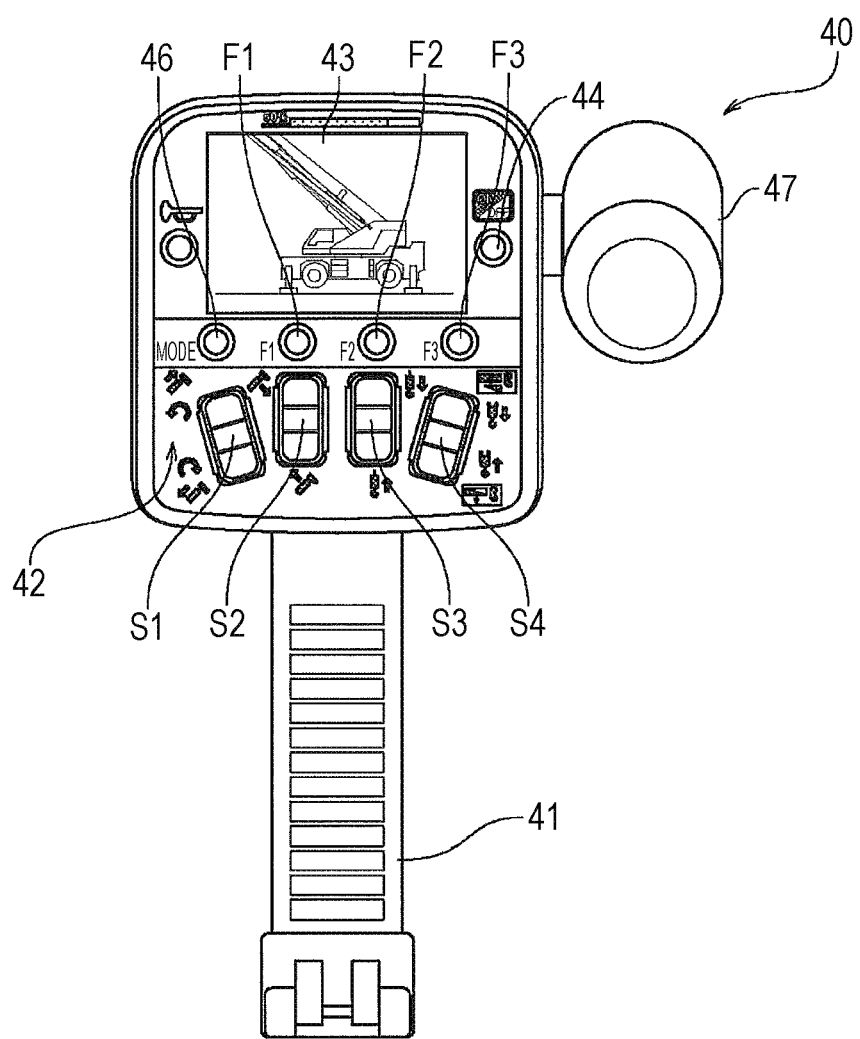
FIG. 3 is a front view of a remote operation device of a first embodiment.
Figure 4:
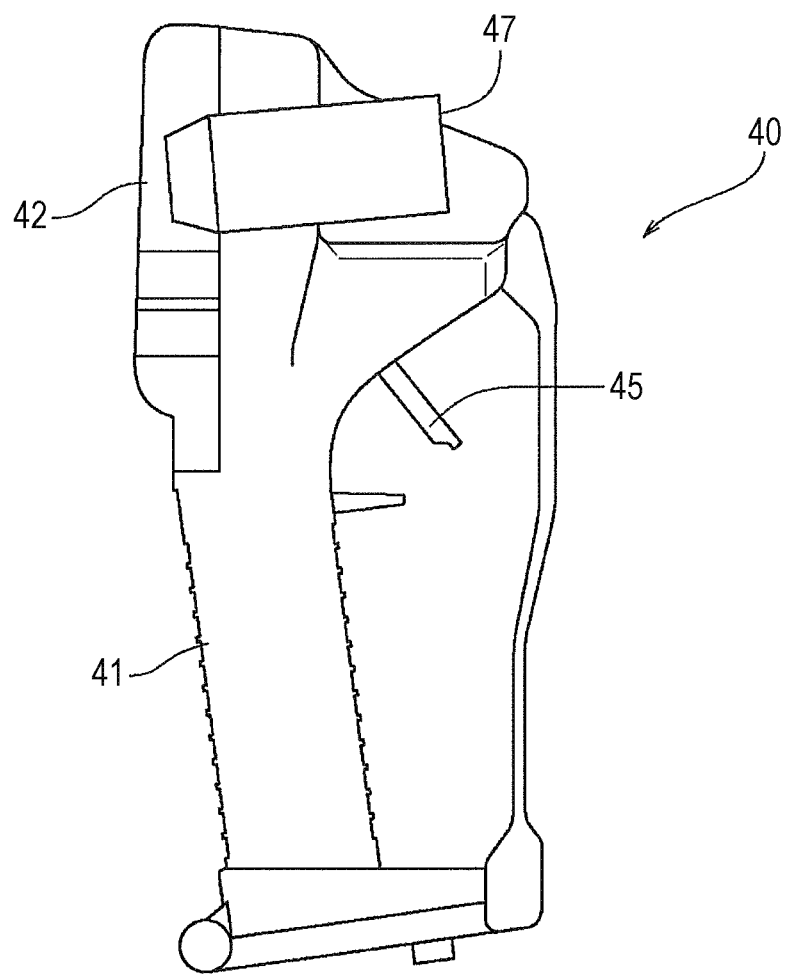
FIG. 4 is a side view of the remote operation device of the first embodiment.

The remote operation device 40 is used to perform work preparation by remote operation, and includes an operation surface 42 for operating the work machine, a grip portion 41 that extends below the operation surface 42 and is held by a hand, as illustrated in FIGS. 2, 3, and 4. In addition, the remote operation device 40 includes a communication unit 40*a* as a reception unit, and issues instructions to the controller 70 and acquires information from the controller 70 via the communication unit 70*a* of the controller 70 by operating lever switches S1 to S4, setting buttons F1 to F3, and the like described below. In other words, the communication unit 40*a* transmits an operation signal generated by the operation unit 42 to the controller 70. In addition, in the case of functioning as the reception unit, the communication unit 40*a* receives the detection signals of the detection devices 81 to 84 from the controller 70. On the back side of the grip portion 41, a trigger 45 is disposed to be operated with an index finger in a state where the grip portion 41 is gripped. As will be described later, the trigger 45 causes the actuator selected by a selection means to drive in a selected direction (forward direction or reverse direction) at a speed corresponding to an operation amount. Further, as illustrated in FIGS. 3 and 4, a video camera 47 for capturing a video image in the front is preferably mounted to the remote operation device 40. Incidentally, since functions and effects of the video camera 47 will be described in a second embodiment, a description thereof will be omitted in the present embodiment.

The operation surface 42 includes: a large display unit 43 such as a liquid crystal display disposed on the upper part; a power switch 44 disposed on the right side of the display unit 43; a mode button 46 disposed on the lower left of the display unit 43; three setting buttons F1, F2, and F3 disposed side by side on the right side of the mode button 46; and swing lever switch S1, a hoisting lever switch S2, a sub-winch lever switch S3, and a main winch lever switch S4 as four selection means disposed below respectively corresponding to the mode button 46 and the setting buttons F1, F2, and F3. The main winch lever S4 can be used by switching to operation of the side up cylinder 31.

When the mode button 46 is pressed and held for a long time, the display unit 43 switches to a setting screen, and when the setting buttons F1, F2, and F3 are pressed subsequently to the mode button 46, the display unit 43 switches to a crane mode (bottom board suspension process mode), an outrigger extension and storage process mode, jib attaching and detaching process mode, respectively. On basic screens of the three process modes, at positions corresponding to respective buttons and lever switches in the display unit 43, corresponding types of actuators and the like are displayed by icons.

On the display unit 43 of the present embodiment, separately from the basic screen of each process mode (switching display), or additionally on the basic screen of each process mode, as a work procedure, on the basis of the state of the work machine, a manual (electronic data version of an instruction manual) of a procedure of work preparation and/or navigation of the work preparation (work instruction) are displayed. The display unit 43 is preferably a touch screen capable of operation input by touching with a fingertip.

By the work machine including the above-described detection devices 81 to 84 and the communication unit 70*a* as the transmission unit, and the remote operation device 40 including the operation unit 42, the reception unit 40*a*, and the display unit 43, the work procedure guidance system S of the present invention is configured.

(Function—Jib Attaching and Detaching Process)

Next, a function will be described of the work procedure guidance system S of the present embodiment. First, an example will be described in which the display unit 43 of the remote operation device 40 displays the work procedure of the jib attaching and detaching process. In the jib attaching and detaching process, the boom 14 and the jib 30 are operated to attach or detach the jib 30 to the distal end of the boom 14. Since the work preparation including the jib attaching and detaching process has a complicated procedure and is difficult for an inexperienced worker to work, an operator of the crane has to leave the operator's cab 18 and perform preparation by manual work. Further, since it is required for the operator to perform in parallel manual work, operation of the work machine, and confirmation of the work procedure, it has taken a considerable time for the work preparation in some cases.

In addition, in the rough terrain crane 1 or the all terrain crane, it takes time for the operator to go up to and down from the operator's cab 18. For this reason, in a case where the operator returns to the operator's cab 18 due to an erroneous procedure and then re-operates the work machine, there has been a possibility of delaying work preparation and affecting the entire process at the site. Therefore, the work procedure guidance system S of the present invention solves such a problem by displaying the work procedure on the display unit 43 of the remote operation device 40, as described below.

First, the operator turns on a remote operation function in the operator's cab 18 and further presses the power switch 44 to turn on the power of the remote operation device 40. Next, when the operator presses the setting button F3 subsequently to the mode button 46 on the mode select screen (initial screen), the display unit 43 of the remote operation device 40 displays the jib attaching and detaching process mode. In the jib attaching and detaching process mode, a manual of the work procedure of the jib attaching and detaching work is displayed on the display unit 43.

Figure 5:
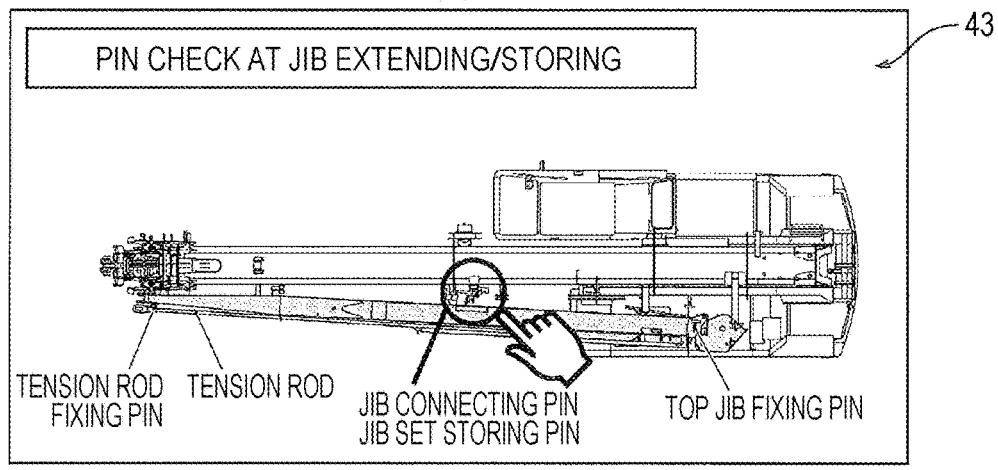
FIGS. 5(a) to 5(c) are images displayed on a display unit of the remote operation device of the first embodiment.
Figure 5:
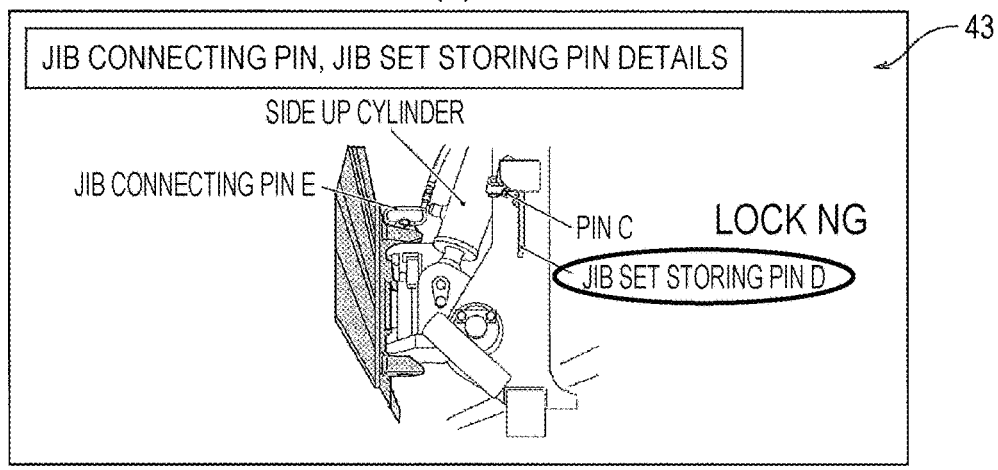
Figure 5:
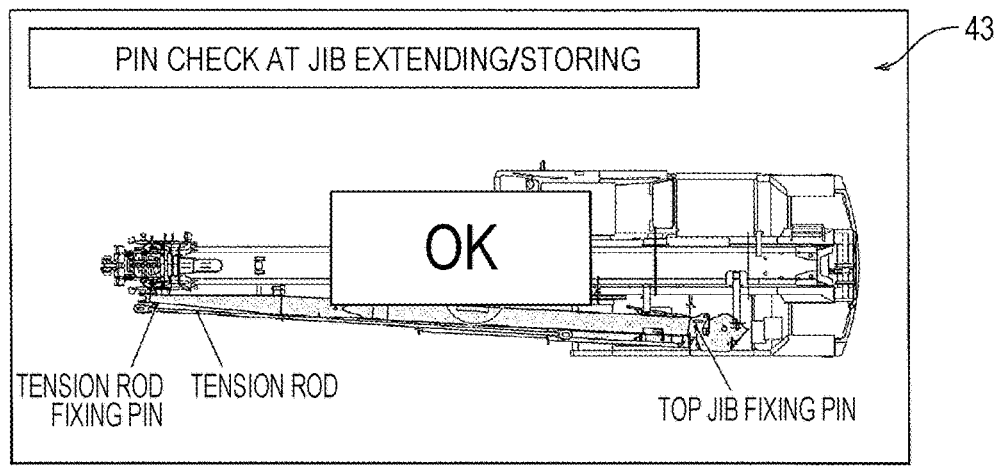

For example, a screen illustrated in FIG. 5(*a*) is displayed on the display unit 43 of the remote operation device 40. In the screen, it is displayed, on the upper left, that the work is in a stage of "pin check at jib extending/storing." In the screen of the display unit 43, a portion of "jib connecting pin/jib set storing pin" is surrounded by a circular line and further is indicated by a hand icon. As a result, the operator performing work preparation knows that there is a mistake in the jib connecting pin and/or the jib set storing pin. In the case of the touch screen type display unit 43, by touching the inside of the circular line with the fingertip, or by pressing a button or the like, the display unit 43 switches to the next screen.

Next, a screen illustrated in FIG. 5(*b*) is displayed on the display unit 43. In the screen of the display unit 43, it is displayed, on the upper left, that the work is in a check stage of "Jib connecting pin, jib set storing pin details." In the screen of the display unit 43, a portion of "jib set storing pin D" is surrounded by an elliptical line, and further "LOCKNG" is written together. As a result, the operator knows that the jib set storing pin D is not in a locked state. The operator actually operates the remote operation device 40 to operate the side up cylinder 31, and further brings the jib set storing pin D in the locked state by manual work.

Next, a screen illustrated in FIG. 5(*c*) is displayed on the display unit 43. That is, it is detected, by the jib set storing pin detection device 82, that the jib set storing pin is brought into the locked state. Next, it is transmitted, from the communication unit 70*a* of the controller 70 to the communication unit 40*a* of the remote operation device 40, that the jib set storing pin is brought into the locked state. Then, the display unit 43 returns to the screen of the pin check at jib extending/storing, and "OK" is displayed largely at the center of the screen. As a result, the operator recognizes that the pin check at this stage is in a correct state.

(Function—Machine Maintenance Process)

Similarly, an example will be described in which the work procedure of a machine maintenance process is displayed. For example, in a case where a hydraulic device, operation device, outrigger device, swing device, boom and jib device, lifting device, and safety device are inspected as a pre-operation inspection, the display unit 43 can display work procedures, check items, and the like. Further, the display unit 43 can display the work procedure of wire rope replacement. Specifically, in the wire rope removal work, the display unit 43 displays "(1) Install the outriggers, and directs the boom to the rear or side. (2) Lower the boom to the full, and bring the hook down on the ground. (3) Remove the rope socket from the hook or the distal end portion of the boom. (4) Remove the wire clip, and punch out the wedge to remove the wire rope from the rope socket. (5) Remove the wire rope from the hook and the weight of the over-winding prevention device. (6) Perform winch winding down operation while pulling the wire rope, and wind the wire rope around the wooden frame." In this example, the work procedure is displayed on the display unit 43 in accordance with detection results of states of the outriggers 11 and the winch.

(Function—Counterweight Attaching and Detaching Process)

Similarly, an example will be described in which the work procedure of a counterweight attaching and detaching process is displayed. A counterweight attaching and detaching device places the counterweight 19 at a predetermined position on a vehicle frame, extends a hydraulic cylinder provided on the counterweight 19 side, and slides a locking member provided on a support base at the rear of the swivel base, thereby locking and unlocking an expanded portion provided at the distal end portion of the rod of the hydraulic cylinder with respect to the support base. In this case, the display unit 43 displays "(1) Expand the hydraulic cylinder. (2) Slide the locking member." In this example, the work procedure is displayed on the display unit 43 in accordance with a detection result of a state of the hydraulic cylinder.

(Function—Luffing Jib Attaching and Detaching Process)

Similarly, an example will be described in which the work procedures are displayed of a luffing jib attaching and detaching process and a deflection suppressing device attaching and detaching process. For example, in extension work of the deflection suppressing device, steps are sequentially executed, which are a mast extension step of performing posture change of a mast from the storage posture to the extension posture, a rope connection step of connecting a tension rope to the distal end portion of a telescoping boom, a boom extension/elevation step of extending and elevating the telescoping boom up to a boom length and a hoisting angle at which pretension applying operation to the tension rope is possible, a drum lock step of restricting rotation of a drum of a tension winch, and a pretension applying step of applying pretension to the tension rope. In this example, the work procedure is displayed on the display unit 43 in accordance with an input received from a boom hoisting angle detection means, a tension rope connection input means, a boom elevation means, or the like.

Effects

Next, effects will be described of the work procedure guidance system S of the mobile crane of the present embodiment.

(1) As described above, the work procedure guidance system S of the mobile crane of the present embodiment is the work procedure guidance system S mounted on the rough terrain crane 1, and the system includes: the work machine including the detection devices 81 to 84 that detect the state of the work machine, and the transmission unit 70a that transmits the state of the work machine detected by the detection devices 81 to 84; and the remote operation device 40 including the operation unit 42 for performing remote operation of the work machine, the display unit 43 that displays the work procedure, and the reception unit 40a that receives the state of the work machine transmitted by the transmission unit 70a. The display unit 43 of the remote operation device 40 is configured such that the work procedure is displayed on the basis of the received state of the work machine. According to this configuration, guidance can be provided of a correct procedure to the operator in accordance with a work scene on the basis of the actual state of the work machine.

That is, the display unit 43 of the portable remote operation device 40 is configured such that the work procedure is displayed, whereby the operator can simultaneously perform in parallel three operations, manual work, operation of the work machine, and confirmation of the work procedure. Conversely speaking, even if the operator tries to work while carrying the instruction manual, the thick instruction manual is unsuitable for carrying and it is difficult to find an appropriate explanation according to the state of the work machine and the work scene.

(2) In addition, the display unit 43 of the remote operation device 40 is configured such that the procedure of work preparation of the mobile crane is displayed as the work procedure, whereby the operator can learn the procedure of work preparation required to be performed by manual work by oneself, near the jib 30 and the boom 14. For that reason, the remote operation device 40 suppresses going up to and down from the operator's cab 18 for confirming manuals and operating the work machine, and the operator can efficiently perform work preparation.

(3) More specifically, the display unit 43 of the remote operation device 40 is configured such that the procedure of the jib attaching and detaching work of the mobile crane is displayed as the work procedure, whereby the operator can learn the procedure of the complicated jib attaching and detaching work, near the jib 30 and the boom 14. For that reason, the remote operation device 40 suppresses going up to and down from the operator's cab 18 for confirming manuals and operating the work machine, and the operator can efficiently perform work preparation. Particularly, in the jib attaching and detaching process where the number of times is large of manual work by the operator oneself, the operator can use the portable remote operation device 40 to perform both display of the work procedure and operation of the work machine, so the work efficiency is greatly improved.

Besides, as the procedure of work preparation, in the machine maintenance process, the counterweight attaching and detaching process, the luffing jib attaching and detaching process, the deflection suppressing device attaching and detaching process, and the like, the work procedure can also be displayed on the basis of the received state of the work machine, on the display unit 43 of the remote operation device 40.

Second Embodiment

Figure 6:
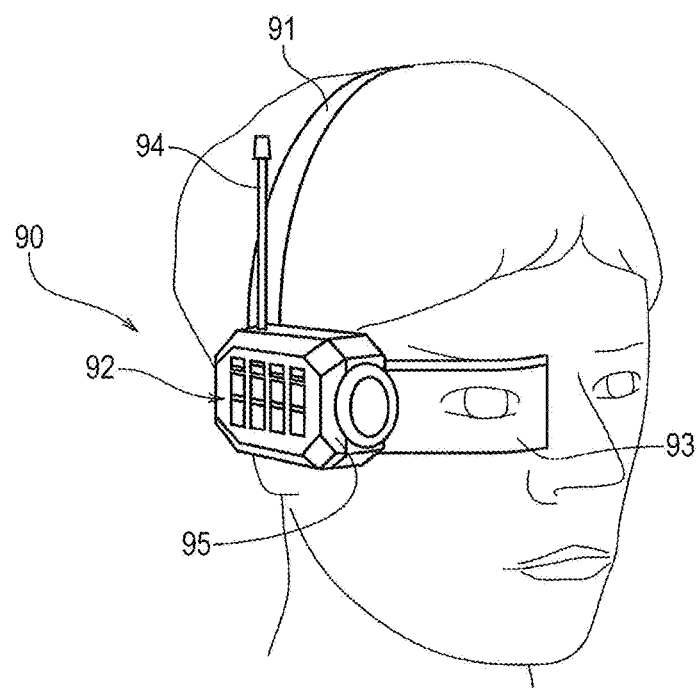
FIG. 6 is a perspective view of a remote operation device of a second embodiment.
Figure 7:
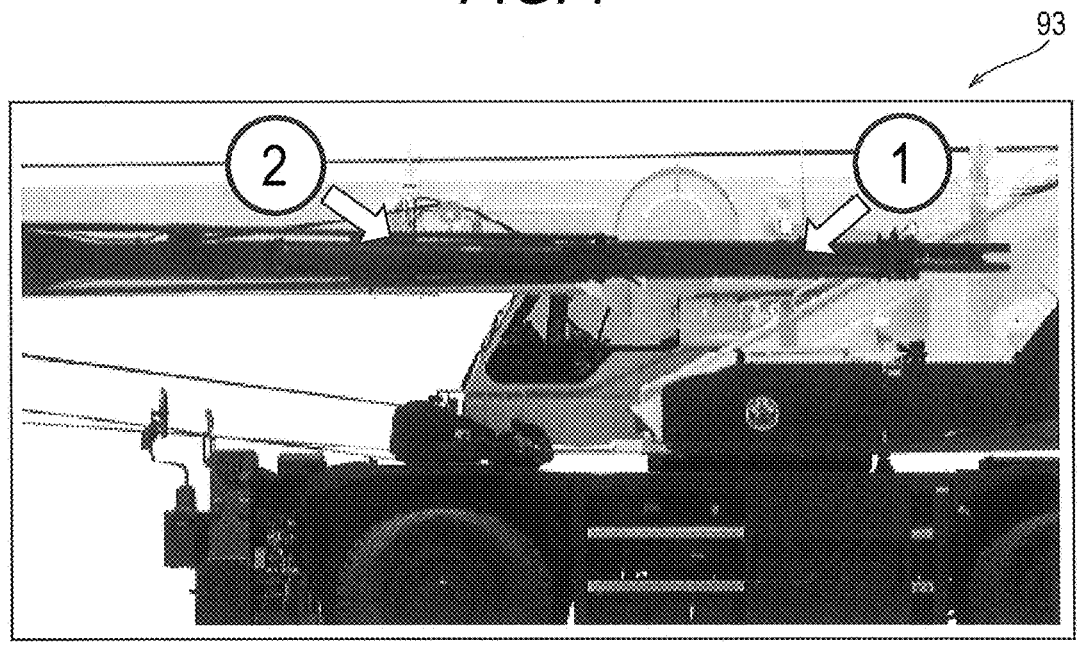
FIG. 7 is an image displayed on a display unit of the remote operation device of the second embodiment.

Hereinafter, with reference to FIGS. 6 and 7, a work procedure guidance system S will be described including a remote operation device of a different form from that of the first embodiment. Incidentally, the same or equivalent parts as those described in the first embodiment will be described with the same reference signs.

First, as for a configuration, in a present embodiment, substantially the same as the first embodiment, the work procedure guidance system S includes the detection devices 81 to 84, the communication unit 70a as a transmission unit, and a remote operation device 90. The remote operation device 90 of the present embodiment is a wearable type remote operation device 90 unlike the hand-held type remote operation device 40 of the first embodiment.

The wearable type remote operation device 90 of the present embodiment includes a head gear 91 as a head mounted unit to be mounted on the head, an operation unit 92 for operating the work machine, a translucent type display unit 93 that displays the work procedure, a communication unit 94 that transmits and receives information from the controller 70, and a video camera 95 for capturing a view image of a wearer (video image in the front). Further, the remote operation device 90 preferably has a function of using GPS or the like to recognize a relative position with respect to the rough terrain crane 1 and a direction of the image.

In the present embodiment, the view image captured by the video camera 95 and an image indicating the work procedure are superimposed and displayed on the display unit 93. That is, as illustrated in FIG. 7, the video image actually captured by the video camera 95 and a number indicating navigation of the work procedure are superimposed and displayed on the display unit 93. For example, the display unit 93 provides guidance of the work procedure to confirm the jib set pin A firstly, and to confirm the side up cylinder 31 secondly. In addition, the display unit 93 can add guidance by voice or add a description by text near a number icon. Further, an animation or the like can be added to make an easy-to-understand explanation.

Next, functions and effects will be described. As described above, the work procedure guidance system S of the mobile crane of the present embodiment is the work procedure guidance system S mounted on the rough terrain crane 1, and the system includes: the work machine including the detection devices 81 to 84 and the communication unit 70a; and the remote operation device 90 including the operation unit 92, the display unit 93, and the communication unit 94. The display unit 93 of the remote operation device 90 is configured such that the work procedure is displayed on the basis of the received state of the work machine. According to this configuration, the remote operation device 90 can provide guidance of a correct procedure to the operator in accordance with a work scene on the basis of the actual state of the work machine.

Since the remote operation device 90 of the present embodiment is a wearable terminal that can be mounted on a body, the remote operation device 90 is not required to be held by hand, so that manual work such as work preparation is facilitated. In other words, in contrast to that the operator holds the hand-held type remote operation device with one hand while working with the other hand, if the wearable type remote operation device 90 is used, work can be performed with both hands.

The remote operation device 90 of the present embodiment is the wearable terminal including the head gear 91 as the head mounted unit to be mounted on the head and the video camera 95 that captures the view image of the wearer, and the display unit 93 is configured such that the captured view image and the image indicating the work procedure are superimposed and displayed. According to this configuration, the operator does not need to hold the remote operation device 90 by hand, so that manual work such as work preparation is facilitated. Further, by superimposing navigation on the actual view image, it is possible to make a more easy-to-understand explanation. Moreover, since the navigation is changed in real time in accordance with the state of the work machine, there is no need to find a necessary explanation.

Incidentally, since other configurations, and functions and effects are substantially the same as those of the above embodiment, the descriptions thereof are omitted.

In the above, the embodiments of the present invention have been described in detail with reference to the drawings; however, the specific configuration is not limited to the embodiments, and any design change that does not depart from the gist of the present invention is included in the present invention.

For example, in the embodiments, the case has been described where the top jib fixing pin detection device 81, the jib set storing pin detection device 82, the tension rod fixing pin 83, and the boom length detection device 84 are provided as the detection device; however, not limited thereto, the boom angle detection device or another detection device may be used to detect the state of the work machine.

REFERENCE SIGNS LIST

S Work procedure guidance system
1 Rough terrain crane
81 to 84 Detection device
70 Controller
70a Communication unit (transmission unit)
40 Remote operation device
42 Operation surface (operation unit)
43 Display unit
47 Video camera
90 Remote operation device
91 Head gear (head mounted unit)
92 Operation unit
93 Display unit
94 Communication unit (reception unit)
95 Video camera

The invention claimed is:

1. A remote operation device configured to be capable of communicating with a work machine, the work machine having an operator's cab and a work object outside of the cab, the remote operation device comprising:
    an operation signal generator that generates an operation signal for performing remote operation of the work machine in accordance with an operator's operation;
    a receiver that receives a detection signal of a detection device that detects a state of the work machine;
    a display that displays a screen indicating a work content to be performed by manual work on at least the work object of the work machine on the basis of the state of the work machine; and
    a camera that captures a viewing area of the operator, wherein
    the display performs switching of the screen such that progress status of the work content is reflected triggered by reception of the detection signal from the detection device, and displays an image captured by the camera with the screen, and
    the remote operation device is configured to communicate with the work object outside of the cab.

2. The remote operation device according to claim 1, wherein
    the display displays the work content and a corresponding part of the work machine in association with each other.

3. The remote operation device according to claim 1, wherein
    the work machine is a mobile crane.

4. The remote operation device according to claim 3, wherein
    the display displays the screen in accordance with a procedure of work preparation the work machine.

5. The remote operation device according to claim 4, wherein
    the display displays the screen in accordance with a procedure of jib attaching and detaching work of the work machine.

6. The remote operation device according to claim 1, further comprising
    a wearable terminal that can be mounted on a body of the operator.

7. The remote operation device according to claim 1, wherein
    the display superimposes and displays the image captured by the camera and the screen.

8. A guidance system comprising a remote operation device and a work machine, the work machine having an operator's cab and a work object outside of the cab, the guidance system providing guidance of a work content in the work machine, wherein
    the work machine includes a detector that detects a state of the work machine and a transmitter that transmits the state of the work machine,
    the remote operation device includes
        an operation signal generator that generates an operation signal for performing remote operation of the work machine in accordance with operator's operation,
        a receiver that receives a detection signal of the detection device,
        a display that displays a screen indicating a work content to be performed by manual work on at least the work object of the work machine on the basis of the state of the work machine, and
        a camera that captures a viewing area of the operator,
    the display performs switching of the screen such that progress status of the work content is reflected triggered by reception of the detection signal from the detection device, and displays an image captured by the camera with the screen, and
    the remote operation device is configured to communicate with the work object outside of the cab.

* * * * *